(12) United States Patent
James et al.

(10) Patent No.: US 12,312,454 B2
(45) Date of Patent: May 27, 2025

(54) ELASTOMERIC MATERIAL

(71) Applicants: Tyco Electronics UK Ltd., Swindon (GB); Tyco Electronics Raychem GmbH, Ottobrunn (DE)

(72) Inventors: Matthew Paul James, Swindon (GB); Ladislaus Kehl, Ottobrunn (DE); David Francis Pearce, Swindon (GB)

(73) Assignees: Tyco Electronics UK Ltd., Swindon (GB); Tyco Electronics Raychem GmbH, Ottobrunn (DE)

(*) Notice: Subject to any disclaimer, the term of this patent is extended or adjusted under 35 U.S.C. 154(b) by 291 days.

(21) Appl. No.: 17/469,245

(22) Filed: Sep. 8, 2021

(65) Prior Publication Data

US 2021/0403671 A1   Dec. 30, 2021

Related U.S. Application Data

(63) Continuation of application No. PCT/EP2020/055738, filed on Mar. 4, 2020.

(30) Foreign Application Priority Data

Mar. 8, 2019   (EP) .................................... 19161546

(51) Int. Cl.
| | | |
|---|---|---|
| H01B 3/00 | (2006.01) | |
| C08K 3/04 | (2006.01) | |
| C08K 3/22 | (2006.01) | |
| C08K 5/375 | (2006.01) | |
| C08L 23/16 | (2006.01) | |
| H01B 3/28 | (2006.01) | |

(52) U.S. Cl.
CPC ................. *C08K 3/04* (2013.01); *C08K 3/22* (2013.01); *C08K 5/375* (2013.01); *C08L 23/16* (2013.01); *H01B 3/28* (2013.01); *C08K 2003/2241* (2013.01); *C08K 2201/001* (2013.01); *C08K 2201/002* (2013.01); *C08K 2201/014* (2013.01)

(58) Field of Classification Search
CPC ................................ H01B 9/027; H01B 3/004
See application file for complete search history.

(56) References Cited

U.S. PATENT DOCUMENTS

| | | | |
|---|---|---|---|
| 3,258,522 A | 6/1966 | Bartos et al. | |
| 3,287,489 A | 11/1966 | Hvizd, Jr. | |
| 3,349,164 A | 10/1967 | Wyatt | |
| 3,585,274 A | 6/1971 | Tomaszewski et al. | |
| 3,673,305 A | 6/1972 | Mashikian et al. | |
| 3,816,639 A | 6/1974 | Anderson et al. | |
| 3,823,334 A | 7/1974 | Philofsky et al. | |
| 3,828,115 A | 8/1974 | Hvizd, Jr. | |
| 3,950,604 A | 4/1976 | Penneck | |
| 4,053,702 A | 10/1977 | Erickson et al. | |
| 4,234,439 A | 11/1980 | Kehr et al. | |
| 5,665,212 A * | 9/1997 | Zhong | B29C 70/882 |
| | | | 429/105 |
| 5,733,480 A * | 3/1998 | Lee | H01B 1/24 |
| | | | 428/221 |
| 6,251,513 B1 * | 6/2001 | Rector | H01C 7/105 |
| | | | 524/789 |
| 6,441,084 B1 | 8/2002 | Lee et al. | |
| 7,923,500 B2 | 4/2011 | Siegel et al. | |
| 10,734,305 B2 * | 8/2020 | Kanaya | H01L 23/42 |
| 2008/0132131 A1 * | 6/2008 | Tzou | C08J 5/249 |
| | | | 524/401 |
| 2016/0365164 A1 * | 12/2016 | Fukuda | H02K 3/32 |
| 2017/0081499 A1 | 3/2017 | Hotta et al. | |
| 2017/0250008 A1 * | 8/2017 | Somasiri | H01B 9/021 |

FOREIGN PATENT DOCUMENTS

| | | |
|---|---|---|
| EP | 0035271 A1 | 9/1981 |
| GB | 1394272 | 5/1975 |
| WO | 2017100614 A1 | 6/2017 |

OTHER PUBLICATIONS

PCT Notification, The International Search Report and the Written Opinion, dated Apr. 28, 2020, 13 pages.

Federico Carpi, et al., "Enhancing the Dielectric Permittivity of Elastometers" In: Dielectric Elastomers as Electromechanical Transducers, Fundamentals, Materials, Devices, Models and Applications of an Emerging Electroactive Polymer Technology, Jan. 1, 2008, Springer XP055689367, ISBN: 978-0-08-047488-5, pp. 51-68, DOI: 10.1016/B978-0-08-047488-5.00006-X.

Petra Potschke, et al., Percolation behavior and mechanical properties of polycarbonate composites filled with carbon black/carbon nanotube systems, Polimery 2012, 57, nr3, pp. 204-211, dated 2012, 8 pages.

* cited by examiner

*Primary Examiner* — Chau N Nguyen
(74) *Attorney, Agent, or Firm* — Barley Snyder

(57) ABSTRACT

An elastomeric material for providing electrical stress control comprises 5 to 40 volume percent low structured carbon black, 0.5 to 10 volume percent of high structured carbon black, up to about 30 volume percent of high permittivity inorganic fillers, and a remainder of polymeric carrier material and functional additives.

14 Claims, No Drawings

ELASTOMERIC MATERIAL

CROSS-REFERENCE TO RELATED APPLICATIONS

This application is a continuation of PCT International Application No. PCT/EP2020/055738, filed on Mar. 4, 2020, which claims priority under 35 U.S.C. § 119 to European Patent Application No. 19 161 546.7, filed on Mar. 8, 2019.

FIELD OF THE INVENTION

The present disclosure relates to an elastomeric material for cable terminations and cable accessories and its use for insulating conductive cables used in electrical power transmission.

BACKGROUND

The importance of safe and uninterrupted transport of electricity cannot be overemphasized. Understanding the steps and procedures that are to be employed in a good electrical safety program requires an understanding of the nature of electrical hazards. For instance, high-voltage systems have uniquely hazardous characteristics in that the high-voltage systems are very high-energy systems. This means that they easily establish and maintain hazardous arc and blast conditions. In many applications, a high voltage (HV) overhead insulator is provided with an isolation path, which insulates the live conductor from the electrical transmission and distribution tower. The HV insulators play vital parts in the transmission and distribution networks, which are used to transmit the electrical power to the consumers through the power system. The glass and porcelain insulators have been used in the power utilities for over one century. These insulators have good resistance against environmental aging and they have been used in a wide range of applications. Polymer insulators, which are also referred to as composite or non-ceramic insulators, are widely used as insulators these days. The non-ceramic insulators show many advantages over the conventional insulators, which make them more preferable than the porcelain and glass insulators. Furthermore, they have better hydrophobicity, lower leakage current, resistance to vandalism and higher mechanical strength. However, the aging of the polymer insulators on electrical power cables contribute to the hazard that is associated with the high voltage electrical power cables.

High degrees of electrical stress is one of the major causes of the aging of the insulation of electrical power cables. The traditional method of reducing the electrical stress and ensuring long cable services is to install a cone of insulating material, with an outer conductive electrode, over the cable shield end. It has been well known that the use of multiple insulation layers of differing permittivity can be used to reduce the levels of electrical stress. The layer at the cable insulation can be seen as an additional capacitance, resulting in a redistribution of the electrical potential. Alternatively, the efforts to reduce the damaging effect of electrical stresses are primarily directed towards improving the polymer insulator.

However, in various applications, such as those encountered in electrical wire insulation, the known polymer insulators have several limitations. Such known polymer insulators have low electrical stress tolerance, high dissipation factor, and unstable dielectric characteristics or may be prone to chemical deterioration or swelling in solvents and gases.

Elastomeric materials comprising particles that impart a variety of properties to elastomers are known in numerous industrial fields. For example, the particles may contribute to esthetical aspects of the elastomeric materials or, for instance, provide a desired color or tinting. The particles may modify mechanical properties, such as hardness, abrasion resistance, wear resistance, tensile and tear strengths and the like, or impart or modulate any other physical property of the matrix comprising them, including thermal conductivity, electrical conductivity, or radiation absorption. Furthermore, elastomeric materials also find use in applications, such as gaskets or seals in oil and gas industry.

Elastomers are generally known to be dielectric materials. In outdoor high-voltage applications, insulation-comprising elastomers normally can withstand various stresses. However, elastomers cannot withstand electrical stresses that give rise to partial discharge, dry band arcing, and corona discharge on the surface of the insulation. To overcome these problems, inorganic fillers are incorporated into the dielectrics. Fillers such as alumina tri-hydrate (properly aluminum hydroxide) and silica are commonly used to impart tracking and erosion resistance to silicone. These fillers enhance the thermal conductivity of materials, thereby removing heat from the area of dry band arcing. Other fillers such as BaTiO3 are incorporated into dielectric materials to increase the relative permittivity for applications involving stress relief in insulation systems, and higher relative permittivity values are easily obtained through binary mixtures of ceramic and metal fillers.

Materials of the general type indicated above, i.e., wherein high permittivity is sought, are known, for example, from U.S. Pat. Nos. 3,258,522 and 3,287,489 along with British Patent No. 1,394,272, all of which disclose the use of carbon black in the development of high permittivity elastomeric materials. Further, the use of ceramic or high permittivity inorganic fillers in materials is disclosed in U.S. Pat. Nos. 3,585,274, 3,673,305, 3,816,639, 3,823,334, 3,828,115 and 4,053,702. The combination of carbon black and planarly oriented conductive platelets in highly polar organic polymer bases, in the form of thin films, has been shown to provide high permittivity with high dielectric strength, as is disclosed in U.S. Pat. No. 3,349,164. According to this patent, however, polar organic polymers are used, e.g. butadiene-acrylonitrile copolymer material with aluminum flake and about 27 percent carbon black. Other known configurations include multi-layer heat shrink products which consist of a low permittivity heat shrinkable polymeric cover which has been internally coated with an elastomeric layer which provides high permittivity principally through the incorporation of silicon carbide particles, although conducting particulate fillers may also be included: see for example U.S. Pat. No. 3,950,604. Combinations of electrically conducting and insulating flakes are also known, as is disclosed in U.S. Pat. No. 4,234,439.

Furthermore, elastomeric materials as known from EP 0035271 provide electrical stress control and comprises a compounded non-polar elastomer, carbon black, from 0.8 to 7.0 volume percent of platelet-shaped conductive particles said materials being characterized in that it contains from 2.5 to 25 volume percent carbon black, from 0 to 8.0 volume percent of high-permittivity inorganic filler and from 0 to 12.0 volume percent of platelet-shaped inorganic dielectric filler.

Carbon black is used to provide unique electrical properties. With the variation of carbon black, filler content in a high performance dielectric material the volume impedance can be modified to control the electrical stress in cable accessories. Carbon blacks vary greatly in their structure. The structural characterization of these materials is difficult because of the very small particles sizes in the materials. In general, the structures are described as being either a "high" structure or a "low" structure. A high structure carbon black usually consists of many primary particles of carbon black fused together with an aciniform aggregate structure. A low structure carbon black consists of a small number of carbon black particles fused together in an aggregate, generally with the larger primary particle size.

Nevertheless, such known elastomers with dielectric materials having high permittivity have a high dissipation factor. These disadvantages entails considerable application risk in electrical power transmission. Consequently, there is a need for an insulation with improved physical properties.

SUMMARY

According to an embodiment of the present disclosure an elastomeric material for providing electrical stress control comprises 5 to 40 volume percent low structured carbon black, 0.5 to 10 volume percent of high structured carbon black, up to about 30 volume percent of high permittivity inorganic fillers, and a remainder of polymeric carrier material and functional additives.

DETAILED DESCRIPTION OF THE EMBODIMENTS

Exemplary embodiments of the present disclosure will be described hereinafter in detail. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details.

The elastomeric material according to the present disclosure comprises inorganic fillers and high structure carbon black. The incorporation of inorganic filler particles along with high structure carbon particles in a matrix of elastomeric material improve the electrical stress tolerance while retaining the essential insulating, rheological and mechanical properties. Further, the elastomeric material having high structure carbon black and inorganic fillers of the present disclosure show a low dissipation factor along a broad range of frequencies. The elastomeric material according to the present disclosure exhibiting a combination of all of these seemingly incompatible properties would be desirable for use in the high-electrical stresses, variable frequencies, and voltages environments that are frequently encountered in the electrical industry.

The elastomeric material according to the present disclosure has a further advantage in that it does not require a state change to recover and can be used both as a hot shrink and a cold shrink. The optimized use of high structured carbon black imparts the elastomeric material according to the present disclosure with the distinguishing technical effects like high permittivity, low dissipation factor with minimal loading of the high permittivity filler while maintaining good mechanical and rheological properties.

According to an exemplary embodiment of the present disclosure disclosed is an elastomeric material for providing electrical stress control and comprising: 5 to 40 volume percent low structured carbon black, 0.5 to 10 volume percent of high structured carbon black, up to about 30 volume percent of high permittivity inorganic fillers, and remaining of polymeric carrier material and functional additives.

According to another exemplary embodiment of the present disclosure inorganic filler in the elastomeric material is preferably less than 20 volume percent of the elastomeric material.

According another exemplary embodiment of the present disclosure inorganic filler comprises barium titanate.

According to another exemplary embodiment of the present disclosure said inorganic filler comprises titanium dioxide.

According to another exemplary embodiment of the present disclosure the polymeric carrier materials for the elastomeric composition is selected from the group of ethylene, propylene, diene monomer rubber.

According to another exemplary embodiment of the present disclosure the elastomeric material comprises preferably thiophenol as functional additive.

According to another exemplary embodiment of the present disclosure the elastomeric material has relative permittivity greater than 15.

According to another exemplary embodiment of the present disclosure the elastomeric material has dissipation factor is less than 0.1 in 50 Hz to 60 Hz AC dielectric fields up to 2 kV/mm.

According to another exemplary embodiment of the present disclosure the elastomeric material dissipation factor is less than 0.1 at frequencies from 1 Hz to 10 MHz.

According to an exemplary embodiment of the present disclosure disclosed does an article for use in heat shrink and/or cold shrink that comprise an elastomeric material according to any of embodiments of the present disclosure.

According to an exemplary embodiment of the present disclosure disclosed is an insulation material for electrical stress control that comprise the elastomeric material according to any of embodiments of the present disclosure.

According to an exemplary embodiment of the present disclosure disclosed is use of elastomeric material according to any of embodiments of the present disclosure for insulating electric cables.

According to an exemplary embodiment of the present disclosure disclosed is use of the elastomeric material according to any of embodiments of the present disclosure for medium stress control termination tubing.

Table 1 shows the standards use for measuring the physical parameters of the elastomeric material according to the examples of the present disclosure.

TABLE 1

| Parameter | Measurement Standard |
|---|---|
| Permittivity | IEC 62631-1 |
| Dissipation Factor | IEC 62631-1 |
| Hardness Shore A | ASTM D2240-15e1 |
| 100% Modulus | ASTM D412-16 |
| Ultimate Tensile Strength | ASTM D412-16 |

TABLE 1-continued

| Parameter | Measurement Standard |
| --- | --- |
| Ultimate Tensile Strain | ASTM D412-16 |
| Dielectric Strength | ASTM D149-09 (213) |

The advantages of a high permittivity and low dissipation factor exhibited by the elastomeric material of the present disclosure comprising an optimized amount of high structure carbon black and inorganic high permittivity filler may be attributed to the percolation phenomenon inherently seen with the high structure carbon black.

The elastomeric material according to the present disclosure is capable of being extruded or molded into a tubular shape, and in a preferred embodiment can also be expanded onto a core for subsequent application. Such a device is typically designated a "PST", which stands for pre-stretched tube. The core can be external, i.e. on the outside of the tube, or can be inside the tube. Preferably, the core is internal and is a one-piece rigid spiral core having interconnected adjacent coils in a closed helix configuration.

By utilizing this PST technique, a completely insulated termination can be applied in a one-step operation. The application consists essentially of a high permittivity tube covered by an arc/track and weather resistant insulation, which is applied to the prepared cable simultaneously with core removal. This can provide a completely insulated termination in which the electric field stresses are controlled effectively by the high permittivity tube through the refraction of electric flux lines at the interface between the cable insulation and high permittivity tube. Another characteristic of a PST that more directly pertains to the method, in which it is applied, is cold shrink. This implicitly means that such devices may be applied to cables without the necessity of a heat source, as is conventionally used with heat shrink tubing. Rather, the characteristics of shrinking behavior are a function of superior elastic memory characteristics of the composition. The composition may also be formulated so as to be utilized in accordance with conventional slide-on techniques.

The elastomeric material comprises 5 to 40 volume percent of low structured carbon black. The carbon black may consist of essentially any commercial grade, from the large particulate size thermal types to the fine reinforcing furnace grades, including the materials termed conductive carbon black. A preferred carbon black, especially for PST applications, is a coarse furnace grade. Preferably, 10 to 30 volume percent of low structured carbon black of the composition is used. Carbon black is necessary to achieve an effective refraction of electric flux lines in the terminating device, and yet allow maintenance of a desired level of elasticity. Typically, the larger the particle size of the carbon black and the lower the structure thereof, the greater the volume fraction thereof is necessary. For the composition of the present disclosure, 7 to 25 volume percent of low structured carbon black is most preferred.

High structure carbon black exhibits a higher surface area when compared to low structure carbon black. The elastomeric material comprises 0.5 to 10 volume percent of high structured carbon black, and preferably 1 to 7 volume percent of high structured carbon black, and most preferably 3 to 5 volume percent of high structured carbon black. The percolation phenomenon exhibited by high-structure carbon black leads to surprising effects of the enhanced dielectric performance of elastomeric material. The percolation threshold depends on the structure of the carbon black and high structure carbon black leads to high permittivity and low dissipation factor of the elastomeric material according to the present disclosure.

While not absolutely essential to functionality of the elastomeric material according the present disclosure, it has been determined that the incorporation of high permittivity inorganic fillers can provide desirable results in the composition of the elastomeric material. Examples of such materials include barium titanate, titanium dioxide, strontium titanate, etc. The use of such materials can provide superior permittivity stability over a range of electrical stresses and can assist in the generation of lower electrical loss for a given permittivity level. Up to about 30.0 percent by volume of these fillers can be included, with less than about 20.0 percent being preferred. The inorganic fillers that are used in the elastomeric material of the present disclosure have been used in the known materials for high performance electrical stress grading materials. However, the combination of high structure carbon black with inorganic fillers exhibiting enhanced dielectric performance is a surprising effect of the present disclosure. Furthermore, the inorganic fillers of the present disclosure can be replaced with liquid rubbers for producing tape/patch products with comparable superior dielectric characteristics.

The balance of the elastomeric material according to the present disclosure comprises polymeric carrier materials like ethylene, propylene, diene monomer rubber and other functional additives like anti-oxidants and stabilizers. The preferred functional additives are selected from the group of commercially available functional additives like Irganox-1010, Evanstab 1218, Lowinox TBm-6 and likes thereof. To the person skilled in the art it is readily recognizable that any other functional additives can also be used. Furthermore, the elastomeric material also uses the extrusion aids of the like of Zinc stearate.

The term "balance", in this case, means normal conventional operations in which ingredients are added to provide the required processing behavior and physical properties of the elastomeric material. Processing could entail open mill or internal mixing, extrusion, steam autoclave or continuous vulcanization or molding techniques. In keeping with conventional preparation of such elastomeric materials, typical process aids, process oils, coupling agents, and vulcanizing agents (if necessary) are included in the compounded elastomeric component.

As aforementioned, one of the key characteristics of the elastomeric material according to the present disclosure is the high permittivity but a low loss (dissipation factor). Both these physical parameters are consistent and stable across a range of frequencies and voltages. The elastomeric material of the present disclosure shows a relative permittivity higher than 15 with dissipation factor less than 0.1 from electric field ranges of 1 to 2 kV/mm and frequency ranges of 1 Hz to 10 MHz The disclosure will now be specifically defined by the aid of the following non-limiting examples, wherein all parts are by weight unless otherwise specified.

Example 1

An elastomeric material was prepared by utilizing the following composition:

| | Part By Weight |
|---|---|
| Vistalon 3666 (trade name for an ethylene/propylene/diene monomer rubber commercially available from EXXON MOBIL) | 42.7 |
| Vistalon 2502 (trade name for an polyisobutylene rubber commercially available from EXXON MOBIL) | 5.4 |
| Oppanol B13 SFN (trade name for an ethylene/propylene/diene monomer rubber commercially available from BASF) | 5.4 |
| N990 Carbon Black (a low structured grade commercially available from Cancarb) | 42 |
| N330 Carbon Black (a highly structured carbon black commercially available from Cabot) | 3 |
| Irganox-1010 (tradename for a sterically hindered primary phenolic antioxidant stabilizer commercially available from BASF) | 0.5 |
| Evanstab 1218 (tradename for a Lauryl/Stearyl Thiodipropionate secondary antioxidant stabilizer commercially available from EVANS CHEMETICS) | 1 |

This provides for a concentration in percent by volume of 26.5 for low structured carbon black and 4.3 for the high-structured carbon black. (Concentration level is specified in terms of volume percentage because electrical characteristics are dependent on the spatial arrangement of particles. The composition was extruded, together with an insulating outer layer into a high permittivity coextruded tubing using a conventional cold feed extruder and vulcanized with the use of an electron beam irradiation source.

As for the physical properties the material exhibited 100 percent modulus of 0.6 MPa; permittivity value was of 10; dissipation factor was found to be 0.007; hardness shore A was measured to be 30, the ultimate tensile strength was of 2.4 MPa; ultimate tensile strain was of 750% and dielectric strength was of 7.2 kV/mm.

Example 2

An elastomeric material was prepared as per Example 1 using the following components:

| | Part By Weight |
|---|---|
| Nordel IP4640 (trade name for an ethylene/propylene/diene monomer rubber commercially available from DOW) | 41 |
| EVATANE 28-40 (trade name for an ethyl vinyl acetate commercially available from Arkema) | 10 |
| N990 Carbon Black (a low structured grade commercially available from Cancarb) | 42 |
| N330 Carbon Black (a highly structured carbon black commercially available from Cabot) | 3 |
| Irganox-1010 (tradename for a sterically hindered primary phenolic antioxidant stabilizer commercially available from BASF) | 1 |
| Zinc-Stearate (tradename for a polymeric extrusion process aid ecommercially available from Univar) | 2 |
| Lowinox TBM-6 (tradename for a hindered thiophenol antioxidant stabilizer commercially available from Addivant) | 1 |

As for the physical properties, the material exhibited 100 percent modulus of 2.4 MPa; permittivity value was of 24; dissipation factor was found to be 0.25; hardness shore A was measured to be 70, the ultimate tensile strength was of 7.2 MPa; ultimate tensile strain was of 650% and dielectric strength was of 7.3 kV/mm.

Composition demonstrated the use of a low-level elastomeric polymer ethylene-vinyl acetate (EVA) which is "rubber like" in its softness and flexibility. The characteristics of the EVA material from the semi crystalline structure of the polymer and the presence of the vinyl acetate group creates a polar polymer network that can be used to enhance the dielectric properties of a stress control material.

Example 3

An elastomeric material was prepared as per Example 1 using the following components:

| | Part By Weight |
|---|---|
| Nordel IP4640 (trade name for an ethylene/propylene/diene monomer rubber commercially available from DOW) | 49.5 |
| Epichlomer D (trade name for an Epichlorohydrin rubber commercially available from Osaka Soda) | 1.5 |
| N990 Carbon Black (a low structured grade commercially available from Cancarb) | 42 |
| N330 Carbon Black (a highly structured carbon black commercially available from Cabot) | 3 |
| Irganox-1010 (tradename for a sterically hindered primary phenolic antioxidant stabilizer commercially available from BASF) | 1 |
| Zinc-Stearate (tradename for a polymeric extrusion process aid ecommercially available from Univar) | 2 |
| Lowinox TBM-6 (tradename for a hindered thiophenol antioxidant stabilizer commercially available from Addivant) | 1 |

As for the physical properties, the material exhibited 100 percent modulus of 1.1 MPa; permittivity value was of 30; dissipation factor was found to be 0.5; hardness shore A was measured to be 40, the ultimate tensile strength was of 6.0 MPa; ultimate tensile strain was of 900% and dielectric strength was of 6.5 kV/mm.

Composition demonstrated the use of a low level a chlorinated rubber. The presence of the chlorine creates a highly polar polymer network which can be used to enhance the dielectric properties of a stress control material.

Example 4

An elastomeric material was prepared as per Example 1 using the following components:

| | Part By Weight |
|---|---|
| Nordel IP4640 (trade name for an ethylene/propylene/diene monomer rubber commercially available from DOW) | 50 |
| N990 Carbon Black (a low structured grade commercially available from Cancarb) | 10 |
| N330 Carbon Black (a highly structured carbon black commercially available from Cabot) | 3 |
| Irganox-1010 (tradename for a sterically hindered primary phenolic antioxidant stabilizer commercially available from BASF) | 1 |
| Zinc-Stearate (tradename for a polymeric extrusion process aid ecommercially available from Univar) | 2 |
| Lowinox TBM-6 (tradename for a hindered thiophenol antioxidant stabilizer commercially available from Addivant) | 1 |
| Tioxide TR81 (tradename for titanium dioxide commercially available from HUNTSMAN) | 20 |

As for the physical properties, the material exhibited 100 percent modulus of 1.2 MPa; permittivity value was of 30;

dissipation factor was found to be 0.5; hardness shore A was measured to be 40, the ultimate tensile strength was of 4.5 MPa; ultimate tensile strain was of 600% and dielectric strength was of 8.0 kV/mm.

Composition demonstrated the use of high permittivity filler titanium dioxide. Titanium dioxide has a typical particle permittivity >50 and with the dielectric properties given by the percolation of the carbon black a high permittivity material can be formulated.

Example 5

An elastomeric material was prepared as per Example 1 using the following components:

|  | Part By Weight |
|---|---|
| Nordel IP4640 (trade name for an ethylene/propylene/diene monomer rubber commercially available from DOW) | 21 |
| N990 Carbon Black (a low structured grade commercially available from Cancarb) | 19 |
| N330 Carbon Black (a highly structured carbon black commercially available from Cabot) | 1.2 |
| Irganox-1010 (tradename for a sterically hindered primary phenolic antioxidant stabilizer commercially available from BASF) | 0.5 |
| Zinc-Stearate (tradename for a polymeric extrusion process aid ecommercially available from Univar) | 0.8 |
| Lowinox TBM-6 (tradename for a hindered thiophenol antioxidant stabilizer commercially available from Addivant) | 0.5 |
| HBPT-01 (tradename for barium titanate commercially available from Whyte Chemicals) | 58 |

The material exhibited 100 percent modulus of 1.5 MPa; permittivity value was of 30; dissipation factor was found to be 0.1; hardness shore A was measured to be 50, the ultimate tensile strength was of 3.5 MPa; ultimate tensile strain was of 500% and dielectric strength was of 7.5 kV/mm.

Composition demonstrated the use of high permittivity filler barium titanate. Barium Titanate has a typical particle permittivity >200 and with the dielectric properties given by the percolation of the carbon black a high permittivity material can be formulated.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An elastomeric material compound for providing electrical stress control, comprising:
    up to about 50 volume percent selected from a group of ethylene, propylene, and diene monomer rubber;
    up to about 10 volume percent of low structured carbon black;
    0.5 to about 3 volume percent of high structured carbon black;
    up to about 1 volume percent sterically hindered primary phenolic antioxidant stabilizer;
    up to about 2 volume percent polymeric extrusion process aid;
    up to about 1 volume percent hindered thiophenol antioxidant stabilizer; and
    up to about 30 volume percent inorganic filler.

2. The elastomeric material compound of claim 1, wherein the inorganic filler comprises barium titanate.

3. The elastomeric material compound of claim 1, wherein the inorganic filler comprises titanium dioxide.

4. The elastomeric material compound of claim 1, wherein the elastomeric material compound comprises thiophenol as a functional additive.

5. The elastomeric material compound of claim 1, further comprising Zinc Stearate.

6. The elastomeric material compound of claim 1, wherein an elastomeric material dissipation factor of the elastomeric material compound is less than 0.1 in 50 Hz to 60 Hz AC dielectric fields up to 2 kV/mm.

7. The elastomeric material compound of claim 1, wherein an elastomeric material dissipation factor of the elastomeric material compound is less than 0.1 at frequencies from 1 Hz to 10 MHz.

8. An elastomeric material compound for providing electrical stress control, comprising:
    up to about 50 volume percent selected from a group of ethylene, propylene, and diene monomer rubber;
    up to about 2 volume percent Epichlorohydrin rubber;
    up to about 45 volume percent of low structured carbon black;
    0.5 to about 5 volume percent of high structured carbon black;
    up to about 1 volume percent sterically hindered primary phenolic antioxidant stabilizer;
    up to about 2 volume percent Zinc-Stearate; and
    up to about 1 volume percent hindered thiophenol antioxidant stabilizer.

9. The article of claim 8, wherein the elastomeric material compound comprises thiophenol as a functional additive.

10. The article of claim 8, wherein the elastomeric material compound comprises has a relative permittivity greater than 15.

11. An elastomeric material compound for providing electrical stress control, comprising:
    up to about 20 volume percent selected from a group of ethylene, propylene, and diene monomer rubber;
    up to about 20 volume percent of low structured carbon black;
    0.5 to about 2 volume percent of high structured carbon black;
    up to about 1 volume percent sterically hindered primary phenolic antioxidant stabilizer;
    up to about 1 volume percent Zinc-Stearate;
    up to about 1 volume percent hindered thiophenol antioxidant stabilizer; and
    up to about 60 volume percent inorganic filler.

12. The elastomeric material compound of claim 11, wherein the inorganic filler comprises barium titanate.

13. The elastomeric material compound of claim 11, wherein the inorganic filler comprises titanium dioxide.

14. The elastomeric material compound of claim 11, wherein the elastomeric material compound comprises thiophenol as a functional additive.

* * * * *